Sept. 18, 1951      D. LESKINEN      2,568,645

HELICOPTER

Filed July 1, 1947      4 Sheets-Sheet 1

INVENTOR.
DAVID LESKINEN,
BY
McMorrow, Berman & Davidson
ATTORNEYS.

Sept. 18, 1951 D. LESKINEN 2,568,645
HELICOPTER

Filed July 1, 1947 4 Sheets-Sheet 4

INVENTOR.
DAVID LESKINEN,
BY
McMorrow, Berman + Davidson
ATTORNEYS.

Patented Sept. 18, 1951

2,568,645

UNITED STATES PATENT OFFICE 2,568,645

HELICOPTER

David Leskinen, San Francisco, Calif.; Lempi Leskinen administratrix of said David Leskinen, deceased Application July 1, 1947, Serial No. 758,315

8 Claims. (Cl. 170—135.24)

This invention relates to helicopters, and more particularly to a helicopter having a pair of co-axial sustaining rotors and means for driving the latter in opposite directions and manually adjusting such rotors to provide flight control for the helicopter.

It is among the objects of the invention to provide an improved rotor, rotor support, rotor drive and rotor control for a helicopter, having a pair of co-axial, oppositely-rotatable rotors, which rotors are variably adjustable to raise and lower the helicopter and provide complete flight control therefor, which support connects the rotors to the helicopter for independent rotation about a common axis and provides a rigid mounting for effectively transmitting forces between the rotors and the body or fuselage structure of the helicopter, which is effective to drive the two rotors in opposite directions at the same rotational speed, so that the rotors will normally counteract between them any torque reaction to the driving of the rotors, and which rotor control is effective to adjustably vary the pitch or incidence angles of the rotor blades in a manner to provide manual control of the rising, descending, forward and reverse travel, and turning of the helicopter, and which rotors, rotor support, rotor drive and rotor control are all integrated into a unitary mechanism of simplified and extremely durable construction providing maximum efficiency of operation, extremely high factors of safety and maximum sensitivity and selectivity of manual control of the flight of the helicopter.

Other objects and advantages will become apparent from a consideration of the following description and the appended claims in conjunction with the accompanying drawings, wherein—

Figure 1:
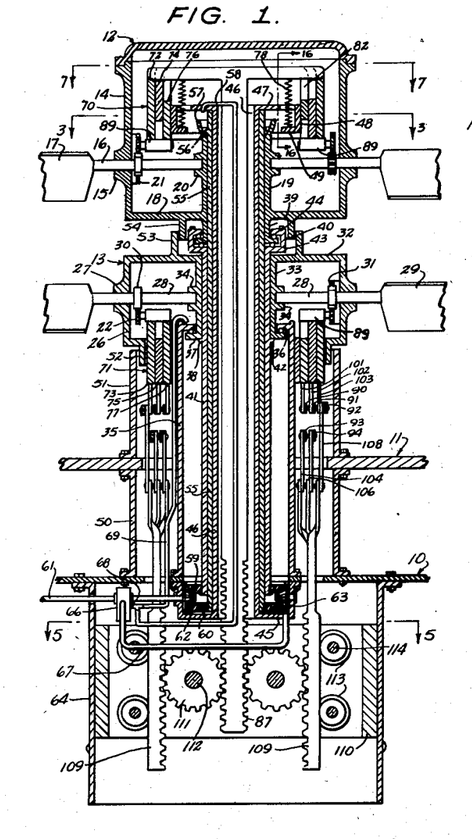
Figure 1 is a longitudinal, medial cross-section through a rotor, rotor support, rotor drive and rotor control assembly illustrative of the invention, a portion of the control mechanism being omitted to avoid confusion in the illustration.
Figures 2, 4:
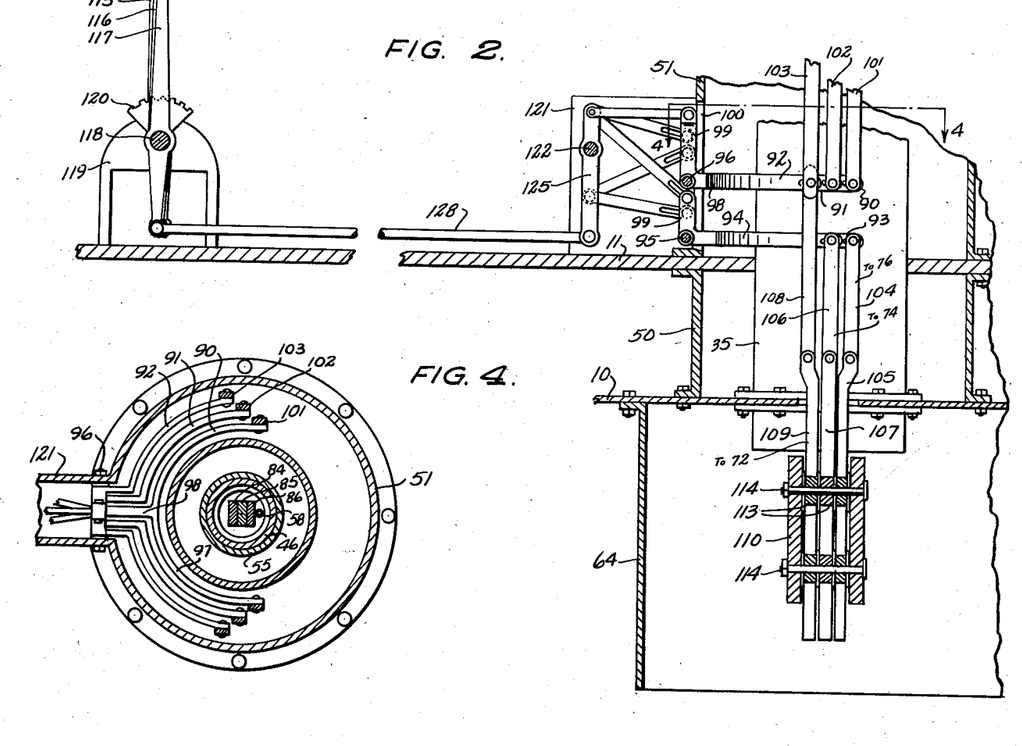
Figure 2 is a longitudinal, medial cross-section on a somewhat enlarged scale of a fragmentary portion of the assembly illustrated in Figure 1 taken in a section plane substantially perpendicular to the section plane of Figure 1 and illustrating portions of the rotor-control mechanism not shown in Figure 1.
Figure 4 is a transverse cross-section taken substantially on the line 4—4 of Figure 2.
Figure 3:
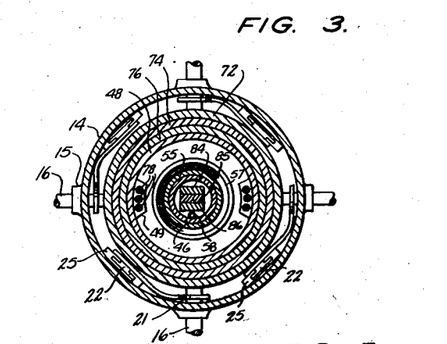
Figure 3 is a transverse cross-section taken substantially on the line 3—3 of Figure 1.

With continued reference to the drawings, and particularly to Figures 1 and 2, the helicopter has a body or fuselage structure including the base plate, generally indicated at 10, and the floor plate disposed above the base plate and substantially parallel to the latter and generally indicated at 11. The two rotors are generally indicated at 12 and 13 respectively, and are supported from the base plate 10 in co-axial relationship with the rotor 12 spaced from and positioned directly above the rotor 13.

The upper rotor 12 comprises a hollow, right cylinder 14 having in its wall four journal bosses 15 angularly spaced substantially 90° from each other. Four rotor blades have respective cylindrical shanks 16 journaled one in each journal boss 15 and respective blades 17 of airfoil cross-section carried by the shanks for pivotal movement about the axes of the respective shanks to vary the pitch or incidence angles of the blades. The cylinder 14 has a bottom wall 18 provided with a central opening which is surrounded internally of the cylinder by a cylindrical sleeve 19, the lower end of which is secured to the wall 18 surrounding the central opening in the latter. This sleeve 19 is provided with four sockets 20 which are angularly spaced apart 90° from each other, and are in alignment with corresponding journal bosses 15, and rotatably receive the inner ends of the respective blade shanks 16, so that the blades are firmly supported in the rotor hub. A gear or gear sector 21 is secured on each blade shank 16 at the inner side of the corresponding journal boss 15, and a rack 22 slidably mounted in a bracket or guideway 23 on the inner surface of the cylindrical hub 14 meshes with the gear sector 21 to rotate the corresponding blade shank 16 and thereby change the pitch or angle of incidence of the rotor blade. There is a respective rack 22 for each gear 21, so that all of the rotor blades are subject to pitch-changing, rotational movement. The racks 22 are operated by rotor-control mechanism to be hereafter described in detail.

The lower rotor 13 also has a hub cylinder 26 provided with journal bosses 27 spaced 90° apart to receive respectively the shanks 28 of the four lower rotor blades. These lower blades also have portions 29 of airfoil cross-sectional shape mounted respectively on the shanks 28 for tilting movement to change their pitch or angles of incidence. Respective gear sectors 30 are secured on the lower blade shanks 28 at the inner sides of the journal bosses 27, and respective racks 31 slidably mounted in guideways provided on the inner surface of the hub cylinder 26 mesh with the corresponding gear sectors 30 and are moved by the rotor-pitch control, to be later described.

The hub cylinder 26 has a top wall 32 divided with a central opening, and an internal sleeve 33 surrounding the opening and extending substantially through the hub cylinder co-axially with the latter. This sleeve 33 is provided with sockets 34 aligned respectively with the journal bosses 27 to rotatably receive the inner ends of the rotor-blade shanks 28 to securely journal the rotor blades in the corresponding rotor hub.

An outer fixed cylinder 35 is secured at its lower end to the upper surface of the base plate 10 surrounding the larger opening in the base plate, and extends upwardly through an opening in the floor plate 11 to a position within the lower rotor hub 26. At its upper end this cylinder is provided with an inwardly-directed, annular flange 36, and the sleeve 33 of the lower rotor hub is provided on its lower end with an outwardly-directed flange 37 underlying the flange 36. Anti-friction bearing elements 38 disposed between the flanges 36 and 37 provide a thrust bearing for transmitting the lift of both rotors through the fixed cylinder 35 to the base plate 10 of the mechanism.

A cylindrical boss 39 extends downwardly from the upper rotor hub 14 concentric with the internal sleeve 19, and is provided on its lower end with an outwardly-extending, annular flange 40. A rotatable quill 41 firmly secured to the sleeve 33 of the lower rotor hub by suitable means, such as a weld 42, is provided in its upper end with an annular extension providing a recess receiving the flange 40 on the boss 39.

An annular cap 44 secured to the upper end of the wall of the enlargement 43 overlies the flange 40, so that the flange is positioned between this cap and the bottom of the enlargement 43. Suitable anti-friction bearing elements are disposed at each side of the flange 40, so that the lift of the upper rotor is transmitted through the boss 39 and boss flange 40 to the annular cap 44 and from this cap through the enlargement 43 and quill 41 to the internal sleeve 33 of the lower rotor hub 26, from which it is transmitted, together with the lift of the lower rotor, from flange 37 to flange 36 through bearing elements 38 and thence through the fixed cylinder 35 to the base plate 10. By this means, the lift of both rotors is transmitted through the fixed cylinder 35 to the base plate, as explained above.

A fixed, annular gear case 45 is secured to the under surface of the base plate 10 surrounding the larger opening therein, and in alignment with the fixed cylinder 35, and an inner fixed cylinder 46 extends from this gear case upwardly to a position spaced somewhat above the top of the internal sleeve 19 of the upper rotor hub. At its upper end the inner fixed cylinder 46 is provided with an outwardly-extending, annular enlargement 47, with a downwardly-extending cylindrical wall 48 connected at its upper end to the periphery of enlargement 47, and with a pair of oppositely-disposed, inwardly-extending spring seats 49 projecting inwardly from the bottom edge of cylindrical wall 48 at the bottom end of the latter for a purpose to be later described.

While the outer fixed cylinder 35 transmits the lift forces between the rotors and the body structure of the helicopter, the inner fixed cylinder 46 supports the rotors against lateral movement relative to the body structure, and maintains the rotational axis of the two rotors substantially perpendicular to the base plate 10 at all times.

A cylindrical casing section 50 is secured at its lower end to the base plate 10 surrounding all of the openings in the base plate, and at its upper end to the floor plate 11 surrounding the opening in the floor plate, and a second cylindrical casing section 51 extends upwardly from the floor plate 11 in alignment with the lower casing section 50 to a location immediately below the hub 26 of the lower rotor 13. The lower rotor hub is provided with a downwardly-extending, cylindrical boss 52 which is received in the upper end of casing 51 for the purpose of draining lubricant from the interior of the lower rotor hub into the upper section of the outer casing. The lower rotor hub is also provided on its top wall 32 with an upwardly-extending, cylindrical boss 53 which receives the lower end of a cylindrical boss 54 extending downwardly from the bottom wall 18 of the upper rotor hub for the purpose of directing lubricant from the interior of the upper rotor hub into the interior of the lower hub.

An inner rotatable quill 55 is disposed between the outer quill 41 and the inner fixed cylinder 46, the quill 55 having bearing contact with the outer surface of the inner cylinder, and the quill 41 having bearing contact with the outer surface of the inner quill 55. This inner quill is extended upwardly into the internal sleeve 19 of the upper rotor hub 12 and is rigidly secured to this internal sleeve by suitable means, such as the weld 56. Above the weld 56 the upper end of the internal sleeve 19 is flared outwardly, as indicated at 57, to receive lubricant from the downwardly-directed, upper end of a lubricant-supply tube 58 which passes upwardly through the inner fixed cylinder 46 from a position below the gear case 45, as will be later explained.

The two rotatable quills 41 and 55 extend at their lower ends into the gear case 45, the inner quill 55 extending below the lower end of the outer quill 41. A suitable crown or beveled gear 59 is secured on the lower end of the outer quill 41 and projects outwardly therefrom, while an opposed crown or beveled gear 60 is secured on the lower end of the inner quill 55 and projects outwardly from the latter. A drive shaft 61 extending from a suitable power plant, such as a conventional internal combustion engine, not illustrated, is journaled near one end in the side wall of the gear case 45, and a beveled pinion 62 is secured on such end of the drive shaft at the inner side of the gear case annular wall and meshes with the two crown gears 59 and 60 to drive these two gears and the corresponding quills 41 and 55 at the same speed in respectively opposite directions. One or more idler pinions 63 may be mounted on axles secured in the annular wall of the gear case and disposed in meshing relation with the two crown gears 59 and 60 to maintain these gears in their proper parallel, spaced-apart relationship.

Since the outer quill 41 is rigidly attached to the lower rotor hub 26 and the inner quill 55 is rigidly connected to the upper rotor hub 14, it is apparent that the two rotor hubs will be rotated at the same speed in respectively opposite directions upon rotation of the drive shaft 61. While a conventional beveled gear mechanism has been illustrated for the purpose of disclosing the invention, it is to be understood that any suitable gear mechanism may be employed for accomplishing the above-stated purpose.

A gear housing 64, somewhat larger than the cylindrical casings 50, is secured to the under surface of the base plate 10 and extends downwardly therefrom surrounding the openings in the base plate. The gear housing 45 constitutes a lubricant sump, and a lubricant pump 66 operatively mounted on the drive shaft 61 has an inlet conduit 67 extending into the sump 45 for supplying lubricant to the pump. The pump has an outlet conduit 68 from which the lubricant-supply pipe 58 and a second lubricant-supply pipe 69 extend. As already explained, the pipe 58 extends from the pump outlet upwardly through the inner fixed cylinder 46 and supplies lubricant to the interior of the upper rotor hub 14 from which the lubricant passes between the quill 55 and the bottom wall of the upper rotor hub from the interior of the upper rotor hub to the interior of the outer quill 41, incidentally lubricating the upper thrust bearing within the annular enlargement 43 of the outer quill 41. From the interior of the outer quill 41, the lubricant passes back to the housing 45. The outer lubricant-supply pipe 69 has a downwardly-turned, upper-end portion which supplies lubricant to the thrust bearing between the flange 37 on the lower rotor sleeve 33, and the flange 36 on the upper end of the fixed outer cylinder 35, and this lubricant, after passing through the thrust bearing, falls through the interior of cylinder 35 back to the gear case 45, lubricating the drive-gear mechanism.

The rotor construction, the rotor supporting structure, the rotor driving mechanism and the means for lubricating the mechanism have now all been described in detail, and the manual control for the rotor-blade pitch will now be described.

A nest of three concentric, cylindrical rings, generally indicated at 70, is disposed in the upper rotor hub 14 concentric with the axis of rotor rotation and a similar nest of three concentric, cylindrical rings, generally indicated at 71, also concentric with the axis of rotor rotation, is disposed within the lower rotor hub 26. The nest of rings 70 is disposed above the corresponding blade shanks 16, and the nest 71 is disposed below the corresponding rotor blade shanks 28, as is clearly illustrated in Figure 1.

The outer ring 72 of the upper nest of rings 70, and the outer ring 73 of the lower nest 71 are both right cylinders having their adjacent edges in respective planes disposed substantially perpendicular to the axis of rotor rotation. The middle ring 74 of the upper nest, the middle ring 75 of the lower nest, the inner ring 76 of the upper nest, and the inner ring 77 of the lower nest are all similar in size and shape to the outer rings 72 and 73, but all of these intermediate and inner rings have cut-away portions, as is particularly illustrated in Figures 13, 14 and 15.

Figure 13:
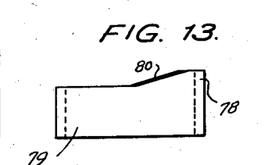
Figure 13 is an elevation of a rotor-blade-pitch-controlling ring constituting an operative component of the flight-control mechanism.
Figure 14:
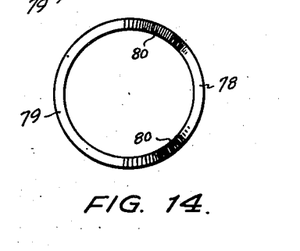
Figure 14 is a top plan view of the ring illustrated in Figure 13.
Figure 15:
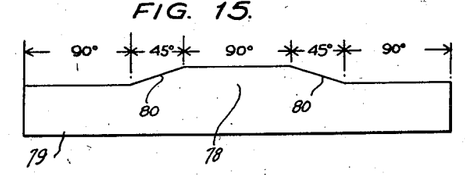
Figure 15 is a development view of the ring illustrated in Figures 13 and 14.

As all of these intermediate and inner rings are of the same general shape, a detailed description of only one is considered necessary for the purposes of the present disclosure, and for this purpose, the middle ring 74 of the upper nest of rings 70 has been selected for detailed illustration in Figures 13, 14 and 15.

This ring has a portion 78 of a width substantially equal to the width of the outer rings 72 and 75, and extending over an arc of substantialy 90° to provide a cam lobe, and a cut-away portion 79 having a width materially less than the width of the portion 78, extending over an arc of approximately 180°, and providing a cam dwell. Between the ends of the portion 79 and the adjacent ends of the portion 78, the edge of the ring is inclined, as indicated at 80, each inclined portion extending through an arc of substantially 45°. As one edge of the ring is disposed substantially in a plane perpendicular to the axis of rotor rotation, the cam lobes extend entirely from the opposite edges of the respective rings. In the operative assembly, as illustrated in Figure 1, the lobes of the rings of the upper nest 70 extend downwardly, and the lobes of the rings of the lower nest 71 extend upwardly. Also, the cam lobe of the middle ring of the upper nest is disposed at the rearward side of the axis of rotor rotation, while the cam lobe of the inner ring of this upper nest is disposed at the forward side of such axis. In the lower nest of rings the cam lobes are similarly disposed, the lobe of the middle ring being disposed to the rear, and the lobe of the inner ring being disposed ahead of the axis of rotor rotation.

Figure 16:
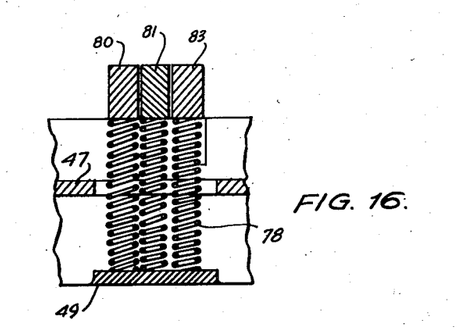
Figure 16 is a longitudinal cross-section of a fragmentary portion of the upper rotor illustrating a structural detail thereof and is taken substantially on the line 16—16 of Figure 7.

The rings of the lower nest 71 are urged to their neutral position by the action of gravity and the rings of the upper nest 70 are urged upwardly to their neutral position by respective pairs of compression springs 78, illustrated in detail in Figure 16.

Figure 7:
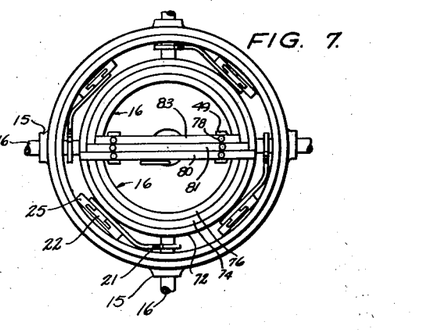
Figure 7 is a top plan view of the mechanism illustrated in Figure 1 with the top cover removed and is taken substantially on the line 7—7 of Figure 1.

Referring particularly to Figures 1 and 7, a bar 80 disposed in the upper portion of the upper rotor hub 14 extends substantially diametrically across the upper nest 70 of control rings, and is connected at its ends to the upper edge of the outer ring 72. A similar bar 81 is disposed alongside the bar 80 and extends substantially diametrically across the nest of rings and is secured at its ends to the upper edge of the middle ring 74, this bar terminating short of the outer ring 72, and the inner ring 76 being provided with notches 82 to receive the bar 81 when the middle ring is moved downwardly relative to the inner ring. A third bar 83 is disposed alongside the bar 81 at the side of the latter opposite the bar 80 and is connected at its ends to the inner ring 76 at substantially diametrically-opposed locations on the latter. Respective rack bars 84, 85 and 86 are connected at their upper ends to corresponding transverse bars 80, 81, and 83 substantially at the mid-length locations of the latter, and extend downwardly through the inner fixed cylinder 46, and are provided near their lower ends with opposite series of rack teeth 87 disposed along the opposite edges thereof. One pair of springs 78, mounted at their lower ends, one on each of the oppositely-disposed spring seats 49, extend upwardly through respective apertures in the enlargement 47 of the fixed inner cylinder and bear at their upper ends against the transverse bar 80 adjacent the ends of the latter. A similar pair of springs is disposed between the seats 49 and the transverse bar 81, and a third set of compression springs is disposed between the seat 49 and the transverse bar 83, each pair of springs urging its corresponding transverse bar upwardly to resiliently urge the respective control rings to their neutral position.

The inner ring 76 of the upper nest of rings 70 is guided on the outer surface of the annular extension or enlargement 48 of the inner fixed cylinder 46, and the corresponding middle and outer rings are guided on the inner ring. The lower nest of rings 71 is similarly guided by contact of the inner ring of this group with the outer surface of a portion of the outer fixed cylinder 35. A respective roller 89 is rotatably mounted at one end of each rack 22 and projects inwardly of the rack to extend across the edges of the corresponding nest of rings. The rollers attached to the racks in the upper rotor hub 14 project inwardly across the bottom edges of rings 72, 74 and 76, while the rollers attached to the racks in the lower rotor hub 26 extend inwardly across the upper edges of the rings 73, 75 and 77. The arrangement of the racks and the corresponding gear sectors 21 is such that when the rollers in the upper rotor hub are forced downwardly, the pitch or incidence angles of the upper rotor blades are increased, and when the rollers 89 in the lower rotor hub 26 are forced upwardly, the pitch of the blades carried by the lower hub is increased, the pitch increase of each blade being dependent upon the amount of downward or upward movement of its associated roller 89. The rollers are maintained in contact with the adjacent edges of the corresponding rings by the aerodynamic and centrifugally induced twisting forces acting on the blades.

If now the outer ring 72 in the upper rotor hub be moved downwardly, the pitch of all of the upper rotor blades will be simultaneously increased throughout the entire rotation of the rotor, thus providing a rotational pitch increase which will increase the lift of the upper rotor. If the outer ring 73 in the lower rotor hub be moved upwardly, the pitch of the lower rotor blades will be similarly increased, and if the two outer rings be moved toward each other simultaneously, the pitch of the blades of the two rotors will be rotationally increased with a corresponding increase in the lift effect of the two rotors. Thus, when it is desired for the helicopter to rise, the two outer rings 72 and 73 are moved toward each other to provide the necessary increase in lift, and when it is desired for the helicopter to descend, these rings are moved away from each other to provide the necessary decrease in rotor lift. If the middle ring 74 in the upper rotor head be moved downwardly, so that its lobe 78 contacts the rollers 89, the pitch of the upper rotor blades will be cyclically increased in a portion of the rotor disc extending from the axis of rotor rotation rearwardly of the helicopter. This will provide an increased lift in the rear portion of the rotor disc only, resulting in a force tending to tilt the helicopter forwardly. If the middle ring in the lower rotor disc be moved upwardly so that its cam lobe contacts the corresponding rollers 89, the pitch of the rotor blades of the lower rotor will also be increased cyclically in a portion of the lower rotor disc extending rearwardly of the helicopter from the axis of rotor rotation, and a lift force will be added to the lift force of the upper rotor tending to tilt the helicopter forwardly.

If now the inner ring 76 in the upper rotor hub be moved downwardly until its cam lobe contacts the rollers 89, the pitch of the upper rotor blades will be cyclically increased in the forward portion of the upper rotor disc, and similarly, if the inner ring 77 in the lower rotor hub be raised until its cam lobe contacts the corresponding rollers 89, the pitch of the lower rotor blades will also be increased in the forward portion of the lower rotor disc, such cyclic pitch increase providing a lift force tending to tilt the helicopter rearwardly.

When the helicopter is tilted forwardly and the rotors provide sufficient lift to maintain it in flight, there will be a forwardly-directed resultant of the force diagram which will impart forward movement to the helicopter. Similarly, when the helicopter is tilted rearwardly, there will be a rearwardly-directed component of the force diagram which will impart rearward movement to the helicopter in flight.

If the blades of one of the rotors be given a greater cyclic pitch than the blades of the other rotor, there will be an unbalanced torque reaction which will tend to turn the helicopter in the air in the direction of rotation of that rotor, the blades of which have the lesser amount of cyclic pitch change.

Means are thus provided for increasing and decreasing the total lift of the two rotors, for cyclically increasing the pitch at the rear or at the front of the rotor discs and for creating an unbalanced torque reaction to turn the helicopter in the air, thus providing for ascent, descent, forward movement, reverse movement, and turning of the helicopter. These various flight-controlling movements of the helicopter are all under the control of manually-operated means, now to be described.

Five bell-crank levers, numbered respectively from 90 to 94, are supported on fixed pivots at the front side of the casing section 51. These levers are grouped in two groups disposed one above the other, the lower of which contains two levers 93 and 94, and are pivotally mounted on a pivot pin 95 secured to the floor plate 11 immediately above the latter, and at the front side of the casing section 51. The upper group contains three levers, 90, 91 and 92, pivotally mounted on a pivot pin 96 supported by the floor plate 11 above the levers 93 and 94, and also at the front side of the casing section 51.

Each of these bell-crank levers, as particularly illustrated in Figure 4 for the levers 90, 91 and 92, has a semi-circular portion 97 from the midlength location of which a shank 98 extends diametrically outward, and an upwardly-extending arm 99 connected at its lower end to the outer end of the shank 98, the respective pivot pin 95 or 96 passing through a suitable aperture provided in each bell-crank lever at the knee where the upwardly-extending arm 99 joins the corresponding shank 98. The housing section 51 is provided with an opening 100 therein to provide clearance for the arms 99 of the several bell-crank levers, and the semi-circular portions 97 of the bell-crank levers are disposed entirely within housing section 51.

A pair of pivoted links 101 connect the ends of the semi-circular portion of the bell-crank lever 90 to the lower, inner ring 77. A similar pair of pivoted links 102 connects the ends of the semi-circular portion of the bell-crank lever 91 to the lower, middle ring 75, and pivoted links 103 connect the ends of the semi-circular portion of the bell-crank lever 92 to the lower, outer ring 73.

A pair of pivoted links 104 connects the ends of the semi-circular portion of the bell-crank lever 93 of the lower group of bell-crank levers respectively with the upper ends of a pair of outside rack bars 105 which, in turn, connect the bell-crank lever 93 with the inner, upper ring 76 through means presently to be described. A pair of pivoted links 106 connects the ends of the semi-circular portion of the bell-crank lever 94 respectively with the upper ends of a pair of outside rack bars 107, which are, in turn, connected with the upper middle ring 74, also by means presently to be described, and a pair of pivoted links 108 connects the ends of the semi-circular portion of the bell-crank lever 92 with a pair of outside rack bars 109, which are, in turn, connected through means, later to be described, with the outer upper ring 72.

Figure 5:
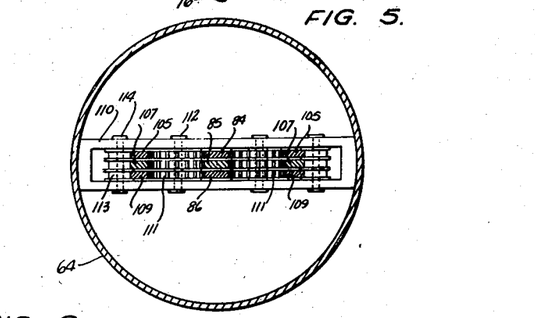
Figure 5 is a transverse cross-section taken substantially on the line 5—5 of Figure 1.
Figure 6:
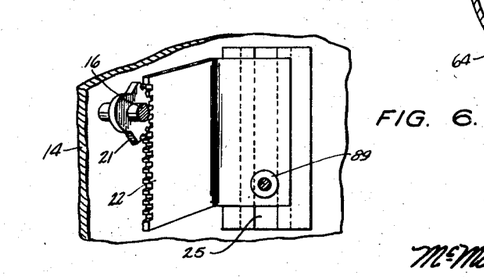
Figure 6 is a perspective view of a fragmentary portion of one of the rotors showing structural details of the rotor-pitch-changing mechanism.

Referring to Figure 5, the three sets of outside rack bars 105, 107 and 109, and the set of middle rack bars 84, 85 and 86 are slidably received in a rectangular frame 110, which extends diametrically across the housing 64 and is secured at its ends to the inner surface of the housing. A respective reversing gear 111 is disposed between each outer rack bar and the adjacent side of the inner rack bar in alignment therewith. These gears are arranged in two sets of three gears each, and each set of gears is journaled in the frame 110 by a respective axle 112 extending through the sides of the frame and upon which the gears are freely rotatable. A respective pair of rollers 113 is disposed at the outer edge of each outside rack bar to maintain the teeth of the rack bar in mesh with the teeth of the corresponding reversing gear 111, the middle rack bars being maintained in mesh with the gears by being included between two opposed reversing gears. The rollers 113 are arranged in four sets of three rollers each journaled in the frame 110 by respective axles 114 upon which the rollers are freely rotatable. Two sets of rollers are disposed at the outer side of each set of outside rack bars, one set of said rollers being disposed above and one below the plane of the axes of the reversing gears 111.

With this arrangement, when the bell-crank lever 92 is moved to raise or lower the outer, lower ring 73, the outer, upper ring 72 is simultaneously lowered or raised by the outer rack bars 109, the corresponding reversing gears 111 and the middle rack bar 86 acting on the transverse bar 80 connected to the upper, outer ring. The middle and inner rings are moved by the bell-crank levers 103 and 102, respectively, and the middle and inner, upper rings are moved by the bell-crank levers 94 and 93, respectively, through the outside rack bars 107 and 105, the corresponding reversing gears 111, the middle rack bars 84 and 85, and the transverse bars 81 and 83.

Three hand-controlled levers 115, 116 and 117 are mounted on a common pivot pin 118 supported by a bracket 119 carried by the floor plate 11 to position the levers convenient to the pilot of the helicopter. The levers are substantially vertically disposed, and the pivot pin 118 extends through respective eyes in the levers positioned intermediate the length of the latter, so that a portion of each lever extends downwardly below the pivot pin. Preferably, a respective toothed quadrant 120 for each lever is carried by the bracket 119, and the levers are provided with spring-pressed detents, so that they can be releasably held in "set" position by the respective quadrants.

A support 121 is mounted on the floor plate 11 at the front side of the upper casing section 51 covering the opening 100 in the latter and a pivot pin 122 is mounted in the support 121 spaced from and substantially parallel to the floor plate 11, and spaced from the forward side of the casing section 51 and substantially parallel to the pivot pins or axles 95 and 96 of the bell-crank levers 90 to 94 inclusive.

Threee lever arms 123, 124 and 125 are pivotally mounted intermediate their length on the pivot pin 122 and the lower ends of these lever arms are connected by respective pivoted links 126, 127 and 128 with respective hand-operated levers 115, 116 and 117.

Hand lever 117 has its bottom end pivotally connected through link 128 with the bottom end of lever arm 125, and the upper end of lever arm 125 is connected by a pivoted link 129 with the upper end of the upstanding arm portion of the bell-crank lever 92. The ends of the semi-circular portion of bell-crank lever 92 are connected through links 103 with the lower, outer ring 73, and through outside rack bars 109, reversing gears 111, inside rack bar 86, and transverse bar 80 to the outer, upper ring 72. If the upper end of the hand lever 117 is moved rearwardly, the lower, outside ring is moved downwardly, and the upper, outside ring is simultaneously moved upwardly thereby decreasing the total rotational pitch angle of the blades of the two rotors, and decreasing the total lift of the rotors. If the upper end of the hand lever 117 is moved forwardly, the lower, outer ring 73 will be moved upwardly, and the upper, outer ring 72 will simultaneously be moved downwardly, thereby increasing the total rotational pitch of the blades of the two rotors, and increasing the rotor lift. This will cause the helicopter to either descend or ascend, as desired, if sufficient power is being supplied to the rotors by the power plant.

Figures 8, 9, 10, 11:
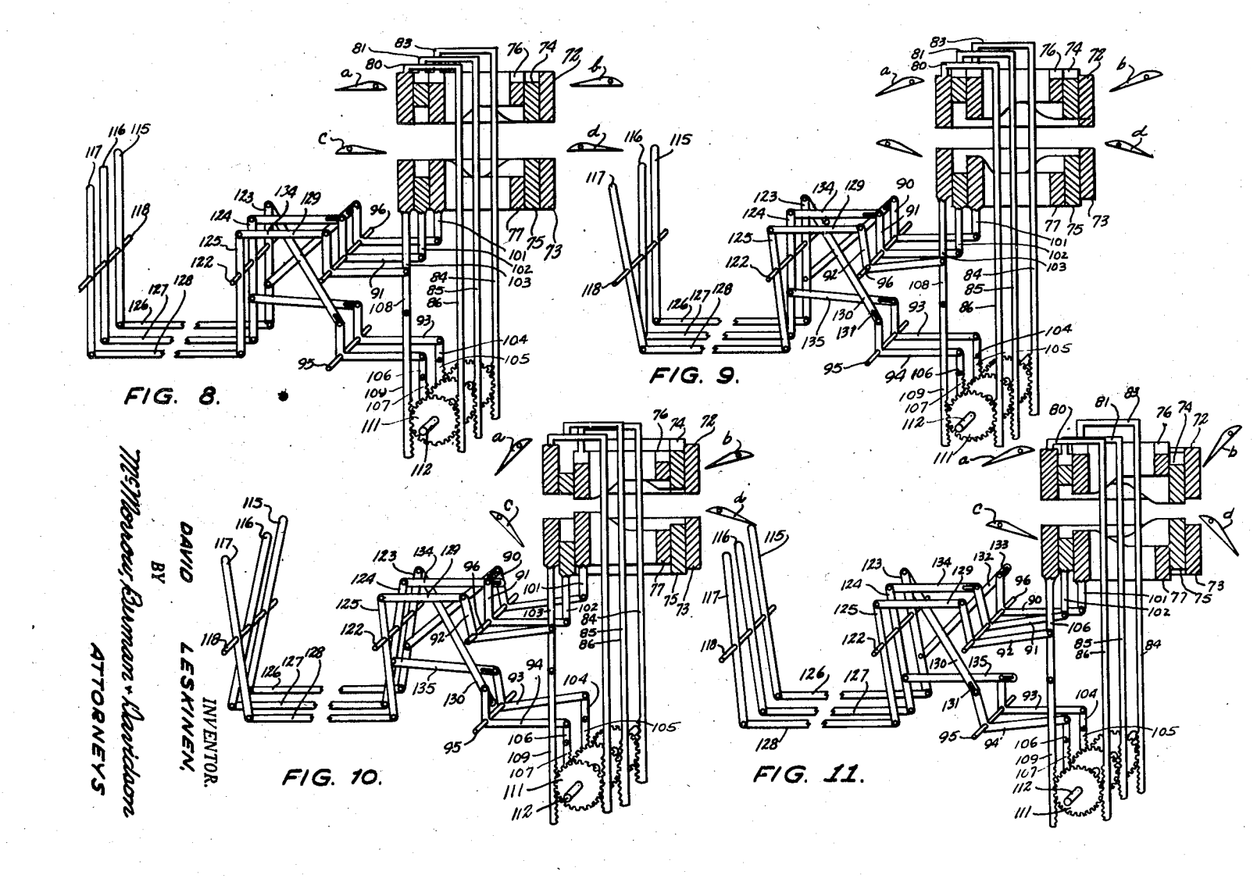
Figures 8, 9, 10, 11 and 12 are diagrammatic views of the rotor-blade-pitch-control mechanism showing the parts of the control mechanism in various operative positions to provide different kinds of flight control for the helicopter.

The change from a neutral position to an increased angle of rotor-blade incidence by forward movement of the hand lever 117 is clearly illustrated in Figures 8 and 9, wherein the pitch angle of rotor blades at the fore-and-aft sides of the two rotors is diagrammatically indicated at $a$, $b$, $c$ and $d$.

Figure 12:
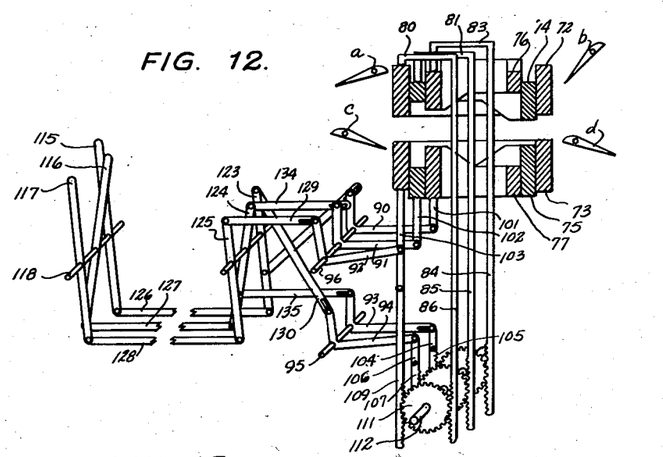

The cyclic pitch change of the blades of the two rotors at the fore-and-aft sides of the axis of rotor rotation and the balance of the torque reaction between the two rotors are controlled by the two hand levers 115 and 116, as diagrammatically illustrated in Figures 10, 11 and 12.

The upper end of lever arm 123, the lower end of which is connected by link 126 to the lower end of hand lever 115, is connected by a link 130 with the upper end of the upstanding arm portion of bell-crank lever 94, the ends of the semi-cylindrical portion of which are connected through outside rack bars 107, reversing gears 111, inside rack bar 85 and transverse bar 81 with the upper, middle ring 74. Lever arm 123 is also connected at a location below pivot pin 122 with the upstanding arm portion 90 through a lost-motion connection including a longitudinally-extending slot 133 connected near the end of the link 132 and connected to the bell-crank lever 90. The ends of the semi-circular portion of bell-crank lever 90 are connected through links 101 with the lower, inner ring 77.

If the upper end of hand lever 115 now be moved rearwardly, as illustrated in Figure 10, bell-crank lever 90 will be moved to raise the lower, inner ring 77. This will cyclically increase the pitch of the blades of the lower rotor at the forward side of the axis of rotor rotation. Because of the slot 131, however, bell-crank lever 94 will not be moved, and no movement will be imported to the upper, middle ring which will be maintained in a neutral position. If hand lever 115 be moved forwardly, however, as illustrated in Figure 11, the upper, middle ring will be lowered, while no movement will be imparted to the lower, inner ring 77.

Lever arm 124 connected at its lower end to the lower end of hand lever 116 by pivoted link 127 has its upper end connected through a link 134 with the outstanding arm portion of bell-crank lever 91, and is connected below the pivot pin 122 to the upstanding arm portion of bell-crank lever 93 by a pivoted link 135. Lost-motion connections are provided between the link 134 and the bell-crank lever 91 and the link 135 and the bell-crank lever 93, so that when the upper end of hand lever 116 is moved forwardly, bell-crank lever 91 is moved, while no movement is imparted to bell-crank lever 93 and when the upper end of hand lever 116 is moved rearwardly, bell-crank lever 93 is moved, while no movement is imparted to the bell-crank lever 91. The ends of the semi-circular portion of bell-crank lever 91 are connected through the link 102 with the lower, middle link 75, and the ends of the semi-circular portion of bell-crank lever 93 are connected through the outside rack bars 105, the inside rack bar 84, and the transverse bar 83 with the upper, inside ring 76.

If now, the upper end of hand lever 116 be moved rearwardly, the upper, inner ring 76 will be moved downwardly, cyclically increasing the pitch of the upper rotor blades at the forward side of the axis of rotor rotation. If the upper end of the hand lever 116 be moved rearwardly, the lower, middle ring will be raised cyclically increasing the pitch of the lower rotor blade at the rearward side of the axis of rotor rotation, as is clearly shown in Figures 10 and 11, respectively.

If the upper ends of both of the hand levers 115 and 116 be moved rearwardly simultaneously, as illustrated in Figure 10, the inner, lower ring 77 will be raised by the hand lever 115, and the upper, inner ring 76 will be simultaneously lowered by the hand lever 116, imparting to the blades of both rotors a cyclic pitch increase at the forward side of the axis of rotor rotation. This will result in an unbalanced lift force at the forward side of the axis of rotor rotation which will incline the helicopter upwardly and forwardly, inclining the normally vertical lift vector upwardly and rearwardly and providing a rearwardly-directed vector component which will impart a rearward movement to the helicopter.

If the upper ends of both of the hand levers 115 and 116 be moved forwardly, as illustrated in Figure 11, the lever 115, acting through the bell-crank lever 94, will lower the middle, upper ring 74. Simultaneously, the lever 116, acting through the bell-crank lever 91 will raise the lower, middle ring 75, thereby imparting a cyclic pitch increase to the blades of both rotors at the rearward side of the axis of rotor rotation. This will provide an unbalanced lift force at the rear of the axis of rotor rotation, inclining the normally vertical lift vector forwardly and upwardly, and providing a forwardly-directed vector component which will give a forward movement to the helicopter.

If now, with both levers 115 and 116 in their forwardly-inclined position, as illustrated in Figure 11, lever 116 be moved rearwardly toward its neutral position, as illustrated in Figure 12, the cyclic pitch increase of the lower rotor blades at the rear of the axis of rotor rotation will be reduced and there will result an unbalanced torque reaction force which will tend to turn the helicopter in the direction of rotation of the lower rotor, since this rotor now has less resistance to rotation than the upper rotor. If the lever 115 had been moved toward neutral position, leaving the lever 116 in its forwardly-inclined position, the helicopter would be turned in the opposite direction. The same will be true when the two levers are in their rearwardly-inclined position, as illustrated in Figure 10, and one of them is moved toward neutral position.

The above-described arrangement thus provides complete flight control of the helicopter, since it may be caused to rise or descend by operation of the hand lever 117, and may be caused to go forwardly or rearwardly, or to turn in the air in either direction by operation of the hand levers 115 and 116.

In order to avoid interference between the transverse bars 80, 81 and 83 and the upper edges of the upper rings 72, 74 and 76, the middle and inner, upper rings 74 and 76 may be provided with suitably located notches or recesses in their upper edges to receive the transverse bars 80 and 81.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a helicopter having a body structure, a pair of co-axial, oppositely-rotatable rotors disposed above said body structure and each including a hub and variable pitched blades projecting radially from the hub, means for supporting said rotors from said body structure, means carried by said body structure for driving said rotors in respectively opposite directions, and manually-operated control means carried by said body structure and connected to said rotors for adjustably varying the pitch of the rotor blades to provide flight control for said helicopter, the arrangement wherein said rotor supporting means comprises a base plate constituting a portion of said body structure and having a large opening therethrough and a pair of small openings disposed one in each side of said large opening, an outer fixed cylinder secured at its lower end to said base plate surrounding said large opening, a thrust bearing between the upper end of said outer fixed cylinder and the lower one of said rotors, a gear case secured to the underside of said base plate surrounding said large opening, a fixed inner cylinder extending upwardly from said gear case concentric with said fixed outer cylinder, a rotatable quill surrounding said inner fixed cylinder and secured to the lower end of one of said rotors, and a thrust bearing between the upper one of said rotors and the upper end of said quill.

2. In a helicopter having a body structure, a pair of oppositely-rotatable, co-axial rotors each having a hub and a plurality of rotor blades journaled in said hub for pitch-changing rotational movement about their longitudinal axes, means supporting said rotors from said body structure, and means carried by said body structure and connected with said rotors to drive the latter in respectively opposite directions, flight control means for said helicopter comprising three pivotally-mounted, hand levers, a respective nest of three concentric, control rings in each rotor hub, means in each rotor hub connecting the corresponding rotor blades to the control rings of the respective nest of rings to vary the pitch angle of said blades in response to movements of said rings, and means connecting said hand levers to said rings for manual movement of said rings during rotation of said rotors.

3. In a helicopter having a body structure, a pair of oppositely-rotatable, co-axial rotors each having a hub and a plurality of rotor blades journaled in said hub for pitch-changing rotational movement about their longitudinal axes, means supporting said rotors from said body structure, and means carried by said body structure and connected with said rotors to drive the latter in respectively opposite directions, flight-control means for said helicopter comprising three hand levers pivotally mounted on said body structure, two non-rotatable nests of three concentric rings each, disposed one nest in each rotor hub substantially concentric with the axis of rotor rotation, each middle and inner ring of each nest having a cam lobe and cam dwell on one edge thereof and said rings being so arranged as to provide in each nest one cam lobe at the forward and one cam lobe at the rearward side of the axis of rotor rotation, cam followers carried by said rotor hubs internally thereof and bearing against corresponding edges of the rings of the respective nests, means connecting each rotor blade at its inner end to a respective cam follower to change the pitch angles of said blades as the cam followers are moved by said rings and thereby provide a total pitch change for said blades and a cyclic pitch change at the forward or rearward side of the axis of rotor rotation, and means connecting said hand levers to said rings for manual movement of said rings by said hand levers during rotation of said rotors.

4. In a helicopter having a body structure, a pair of oppositely-rotatable, co-axial rotors each having a hub and a plurality of rotor blades journaled in said hub for pitch-changing rotational movement about their longitudinal axes, means supporting said rotors from said body structure, and means carried by said body structure and connected with said rotors to drive the latter in respectively opposite directions, flight-control means for said helicopter comprising three hand levers pivotally mounted on said body structure, two non-rotatable nests of three concentric rings each, disposed one nest in each rotor hub substantially concentric with the axis of rotor rotation, each middle and inner ring of each nest having a cam lobe and cam dwell on one edge thereof and said rings being so arranged as to provide in each nest one cam lobe at the forward and one cam lobe at the rearward side of the axis of rotor rotation, cam followers carried by said rotor hubs internally thereof and bearing against corresponding edges of the rings of the respective nests, means connecting each rotor blade at its inner end to a respective cam follower to change the pitch angles of said blades as the cam followers are moved by said rings and thereby provide a total pitch change for said blades and a cyclic pitch change at the forward or rearward side of the axis of rotor rotation, and means connecting said hand levers to said rings for manual movement of said rings by said hand levers during rotation of said rotors, each of said cam followers comprising a cylindrical roller, and the means connecting each rotor blade to a respective cam follower comprising a gear on the rotor blade shank, a guideway carried by the rotor hub internally thereof, and a rack slidably mounted in the guideway and carrying the corresponding roller, said rack having teeth meshing with the teeth of said gear.

5. In a helicopter having a body structure, a pair of oppositely-rotatable, co-axial rotors each having a hub and a plurality of rotor blades journaled in said hub for pitch-changing rotational movement about their longitudinal axes, means supporting said rotors from said body structure, and means carried by said body structure and connected with said rotors to drive the latter in respectively opposite directions, flight-control means for said helicopter comprising three hand levers pivotally mounted on said body structure, two non-rotatable nests of three concentric rings each, disposed one nest in each rotor hub substantially concentric with the axis of rotor rotation, each middle and inner ring of each nest having a cam lobe and cam dwell on one edge thereof and said rings being so arranged as to provide in each nest one cam lobe at the forward and one cam lobe at the rearward side of the axis of rotor rotation, cam followers carried by said rotor hubs internally thereof and bearing against corresponding edges of the rings of the respective nests, means connecting each rotor blade at its inner end to a respective cam follower to change the pitch angles of said blades as the cam followers are moved by said rings and thereby provide a total pitch change for said blades and a cyclic pitch change at the forward or rearward side of the axis of rotor rotation, and means connecting said hand levers to said rings for manual movement of said rings by said hand levers during rotation of said rotors, said means connecting said hand levers to said rings including a plurality of bell-crank levers pivotally mounted on said body structure, links connecting some of said bell-crank levers to the rings in the lower rotor, and means connecting other of said bell-crank levers to the rings in the upper rotor including outside rack bars pivotally connected to said bell-crank levers, middle rack bars connected at their upper ends to respective upper rings, and reversing gears between corresponding outside and middle rack bars.

6. In a helicopter having a body structure, upper and lower, oppositely-rotatable, co-axial rotors each having a hub and a plurality of blades journaled in said hub for pitch-changing rotational movements about their longitudinal axes, means supporting said rotors from said body structure comprising a pair of co-axial, relatively rotatable quills the outer of which is secured at its upper end to the hub of said lower rotor and the inner of which is secured at its upper end to the hub of said upper rotor, a thrust bearing between the upper end of said outer quill and the lower end of said upper rotor hub restraining said upper rotor against upward movement relative to said outer quill, an outer fixed cylinder secured at its lower end to said body structure and surrounding said outer quill below the hub of said lower rotor, a thrust bearing between the upper end of said fixed cylinder and said lower rotor hub, restraining said lower rotor hub and said outer quill against upward movement relative to said fixed outer cylinder, and a fixed inner cylinder secured at its lower end to said body structure and extending upwardly through said inner quill to a position above the latter to support said rotors against radial movement relative to said body structure.

7. In a helicopter having a body structure, upper and lower, oppositely-rotatable, co-axial rotors each having a hub and a plurality of blades journaled in said hub for pitch-changing rotational movements about their longitudinal axes, means supporting said rotors from said body structure comprising a pair of co-axial, relatively rotatable quills the outer of which is secured at its upper end to the hub of said lower rotor and the inner of which is secured at its upper end to the hub of said upper rotor, a thrust bearing between the upper end of said outer quill and the lower end of said upper rotor hub restraining said upper rotor against upward movement relative to said outer quill, an outer fixed cylinder secured at its lower end to said body structure and surrounding said outer quill below the hub of said lower rotor, a thrust bearing between the upper end of said fixed cylinder and said lower rotor hub restraining said lower rotor hub and said outer quill against upward movement relative to said fixed outer cylinder, a fixed inner cylinder secured at its lower end to said body structure and extending upwardly through said inner quill to a position above the latter to support said rotors against radial movement relative to said body structure, and drive means for said rotors comprising a respective beveled gear on the lower end of each quill, a drive shaft rotatably supported by said body structure, and a beveled pinion on said drive shaft meshing with both of said beveled gears to drive said rotor in respectively opposite directions.

8. In a helicopter having a body structure, upper and lower oppositely-rotatable, co-axial rotors each having a hub and a plurality of blades journaled in said hub for pitch-changing rotational movements about their longitudinal axes, means supporting said rotors from said body structure comprising a pair of co-axial, relatively rotatable quills the outer of which is secured at its upper end to the hub of said lower rotor and the inner of which is secured at its upper end to the hub of said upper rotor, a thrust bearing between the upper end of said outer quill and the lower end of said upper rotor hub restraining said upper rotor against upward movement relative to said outer quill, an outer fixed cylinder secured at its lower end to said body structure and surrounding said outer quill below the hub of said lower rotor, a thrust bearing between the upper end of said fixed cylinder and said lower rotor hub restraining said lower rotor hub and said outer quill against upward movement relative to said fixed outer cylinder, a fixed inner cylinder secured at its lower end to said body structure and extending upwardly through said inner quill to a position above the latter to support said rotors against radial movement relative to said body structure, and means for totally and cyclically changing the pitch angles of said rotor blades to provide flight control for said helicopter comprising three hand levers pivotally mounted on said body structure, a respective nest of three concentric control rings in each rotor hub, means in each rotor hub connecting the corresponding rotor blades to the control rings of the respective nest of rings to vary the pitch angle of said blades in response to movements of said rings, and means connecting said hand levers to said rings for manual movement of said rings during rotation of said rotors, the connecting means between said hand levers and the rings in said upper rotor hub extending upwardly through said inner fixed cylinder.

DAVID LESKINEN.

REFERENCES CITED

The following references are of record in the file of this patent:

UNITED STATES PATENTS

| Number | Name | Date |
|--------|------|------|
| 1,084,806 | Lister | June 20, 1914 |
| 2,427,936 | Wales | Sept. 23, 1947 |
| 2,456,485 | Bendix | Dec. 14, 1948 |